United States Patent
McCauley

(10) Patent No.: US 12,247,637 B2
(45) Date of Patent: Mar. 11, 2025

(54) FLUID-DAMPED VALVE

(71) Applicant: AirSpayce Pty Ltd, Currumbin Waters (AU)

(72) Inventor: Michael Charles Harvey McCauley, Currumbin Waters (AU)

(73) Assignee: AirSpayce Pty Ltd, Currumbin Waters (AU)

( * ) Notice: Subject to any disclaimer, the term of this patent is extended or adjusted under 35 U.S.C. 154(b) by 217 days.

(21) Appl. No.: 17/703,148

(22) Filed: Mar. 24, 2022

(65) Prior Publication Data
US 2022/0307568 A1 Sep. 29, 2022

(30) Foreign Application Priority Data
Mar. 24, 2021 (AU) .............................. 2021900867

(51) Int. Cl.
| | | |
|---|---|---|
| *F16F 9/512* | (2006.01) | |
| *F16F 9/32* | (2006.01) | |
| *F16F 9/34* | (2006.01) | |
| *F16F 9/36* | (2006.01) | |
| *F16K 15/02* | (2006.01) | |
| *F16K 15/06* | (2006.01) | |

(52) U.S. Cl.
CPC .............. *F16F 9/512* (2013.01); *F16F 9/325* (2013.01); *F16F 9/34* (2013.01); *F16F 9/369* (2013.01); *F16K 15/026* (2013.01); *F16K 15/063* (2013.01); *Y10T 137/7925* (2015.04); *Y10T 137/7929* (2015.04)

(58) Field of Classification Search
CPC ............ F16K 15/026; Y10T 137/7898; Y10T 137/7903; Y10T 137/7909; Y10T 137/7925
See application file for complete search history.

(56) References Cited

U.S. PATENT DOCUMENTS

| | | | | |
|---|---|---|---|---|
| 122,756 A * | 1/1872 | Camerer | ................ | F16K 15/026 137/540 |
| 307,172 A * | 10/1884 | Broadbent | .............. | F16K 15/06 251/360 |
| 362,678 A * | 5/1887 | Sutton | ..................... | F16K 15/06 137/533 |
| 1,003,479 A * | 9/1911 | Lucas | ................... | F16K 15/026 137/902 |

(Continued)

FOREIGN PATENT DOCUMENTS

| | | |
|---|---|---|
| AU | 199884214 | 4/1999 |
| AU | 2004229045 | 6/2005 |

(Continued)

*Primary Examiner* — Robert K Arundale
(74) *Attorney, Agent, or Firm* — Jenkins, Taylor & Hunt, P.A.

(57) ABSTRACT

A fluid-damped valve comprises a body defining an internal cavity having an inlet for ingress of a fluid and an outlet for egress of the fluid, and a closure member having a narrowed end portion. The closure member is movably disposed within the internal cavity intermediate the fluid inlet and the fluid outlet. The valve includes a seat configured to sealingly receive the closure member. The seat defines a constricted portion of the internal cavity configured to non-sealingly receive the narrowed end portion and damp the flow of the fluid through the fluid-damped valve.

19 Claims, 11 Drawing Sheets

(56) References Cited

U.S. PATENT DOCUMENTS

| | | | | |
|---|---|---|---|---|
| 1,011,147 A * | 12/1911 | Bennett | F16K 15/026 | 137/543.23 |
| 1,247,696 A * | 11/1917 | McIntyre | F16K 27/0272 | 137/533 |
| 2,538,364 A * | 1/1951 | James | F16K 15/026 | 285/902 |
| 2,745,432 A * | 5/1956 | Williams | F16K 15/026 | 137/540 |
| 4,313,463 A * | 2/1982 | Weirich | F16K 17/046 | 137/538 |
| 4,683,910 A * | 8/1987 | Benson | G01L 19/0618 | 137/519 |
| 5,018,547 A * | 5/1991 | Alcorn | B01F 25/315 | 137/538 |
| 5,174,327 A * | 12/1992 | Truax | F16K 15/026 | 137/515.3 |
| 5,295,880 A * | 3/1994 | Parker | F16K 15/026 | 440/88 N |
| 5,332,000 A * | 7/1994 | Gassner | F16K 17/0466 | 251/333 |
| 2002/0036015 A1* | 3/2002 | Miyajima | F16L 33/30 | 137/543.23 |
| 2002/0170603 A1* | 11/2002 | Cerovich | F16K 15/026 | 137/514 |
| 2002/0174990 A1* | 11/2002 | Smith, III | F16L 29/02 | 166/363 |
| 2003/0047216 A1* | 3/2003 | Kelly | F16K 17/06 | 137/538 |
| 2003/0102031 A1* | 6/2003 | Igarashi | F16K 17/0433 | 137/469 |
| 2003/0196703 A1* | 10/2003 | DeCler | F16K 15/18 | 137/538 |
| 2004/0000342 A1* | 1/2004 | Takahashi | F16K 15/025 | 137/538 |
| 2006/0037648 A1* | 2/2006 | Krishnamoorthy | B60K 15/04 | 137/592 |
| 2006/0196553 A1* | 9/2006 | Kane | F16K 15/026 | 137/538 |
| 2008/0042092 A1* | 2/2008 | Endoh | F16F 1/126 | 251/337 |
| 2008/0191428 A1* | 8/2008 | Kane | F16K 15/026 | 277/650 |
| 2010/0037965 A1* | 2/2010 | Hefler | F02M 59/462 | 137/538 |
| 2011/0036423 A1* | 2/2011 | Yi | F16K 15/026 | 137/535 |
| 2012/0234420 A1* | 9/2012 | Matsukawa | F22B 37/02 | 137/538 |
| 2013/0056098 A1* | 3/2013 | Hanjagi | F16K 15/026 | 137/535 |
| 2014/0069530 A1* | 3/2014 | Andersson | F16K 15/06 | 137/535 |
| 2017/0307462 A1* | 10/2017 | Barron | E21B 41/0007 | |
| 2018/0073646 A1* | 3/2018 | Chuang | B60T 17/04 | |
| 2020/0408316 A1* | 12/2020 | Patterson | F16K 39/04 | |

FOREIGN PATENT DOCUMENTS

| | | |
|---|---|---|
| AU | 2005200436 | 8/2005 |
| AU | 2005225145 | 5/2006 |
| AU | 2017201479 | 3/2017 |
| WO | WO2003/102426 | 12/2003 |

\* cited by examiner

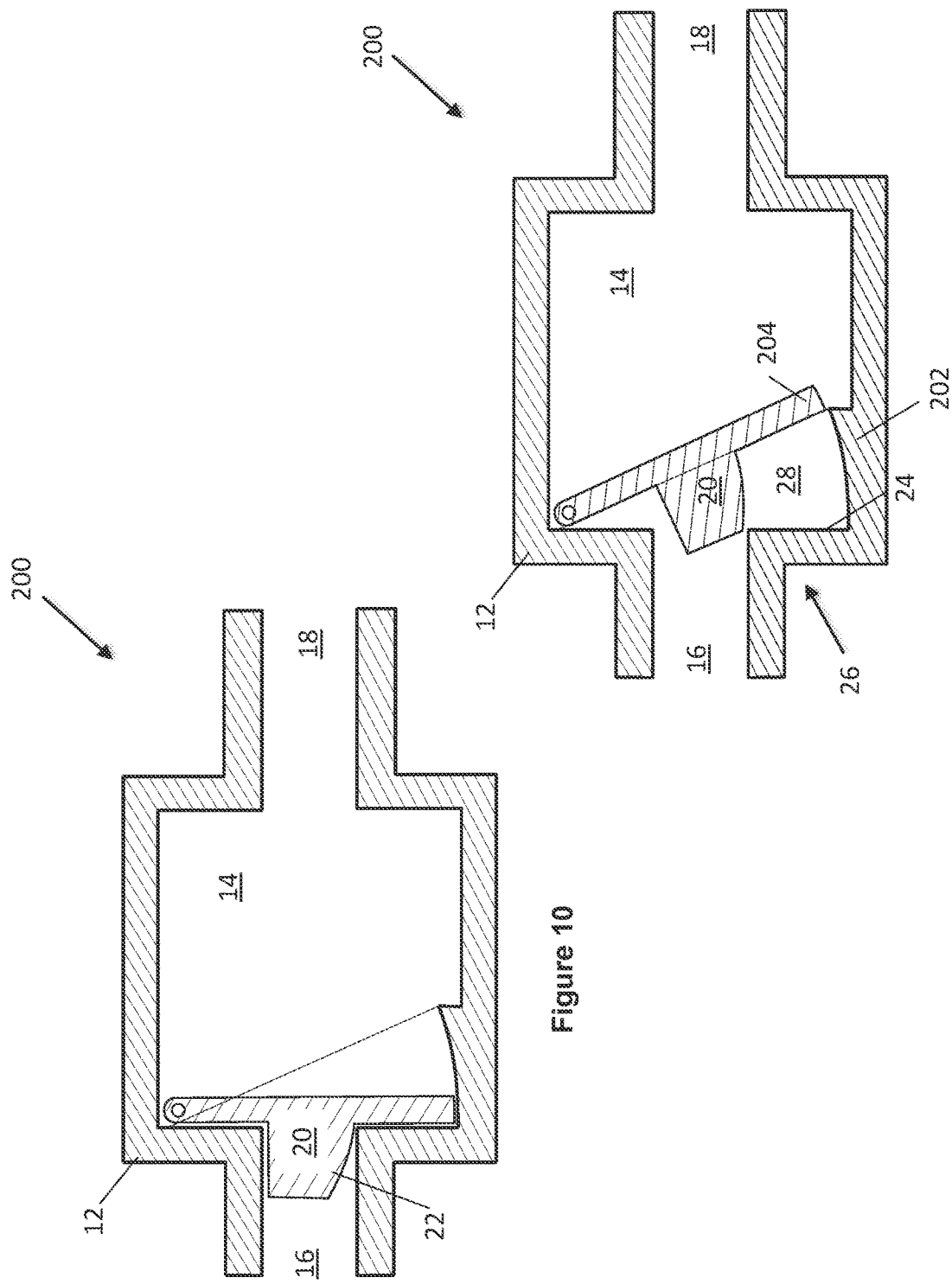

FLUID-DAMPED VALVE

CROSS-REFERENCE TO RELATED APPLICATION

This application claims priority to Australian Patent Application No. 2021900867, filed Mar. 24, 2021, the disclosure of which is incorporated herein by reference in its entirety.

FIELD

The present disclosure generally relates to a fluid-damped valve.

The disclosure relates particularly but not exclusively to a fluid damped valve that is suitable for ameliorating water hammer, particularly in large valves. It will therefore be convenient to hereinafter describe the invention with reference to this example application. However, it is to be clearly understood that it is capable of broader application.

The present disclosure also extends to a fluid flow system including the fluid-damped valve.

DEFINITION

In this specification, the term 'comprising' is intended to denote the inclusion of a stated integer or integers, but not necessarily the exclusion of any other integer, depending on the context in which that term is used. This applies also to variants of that term such as 'comprise' or 'comprises'.

BACKGROUND

The reference to prior art in this specification is not and should not be taken as an acknowledgment or any form of suggestion that the referenced prior art forms part of the common general knowledge in Australia or in any other country.

Fluid hammer (also known as hydraulic shock) is a common and undesirable condition that occurs in the conduits of fluid transfer systems and hydraulic systems. Fluid hammer may occur, for example, on closing a valve through which a fluid flows. Examples of such valves include but are not limited to a check valve, a non-return valve, and a foot valve.

Fluid hammer can manifest with generally any fluid, such as a liquid, or a gas. Some example fluids are fluid chemicals, suspensions, and petroleum products. Fluid hammer in incompressible fluids (diesel fuel, for example) is typically greater than fluid hammer in compressible fluid (natural gas, for example). Water hammer is a type of fluid hammer experienced in some irrigation pipes and the water reticulation of some premises including but not limited to houses, apartments, office buildings, and factories. It also includes in process pipes. During water hammer, the force exerted by the closing valve against the valve seat, combined with the inertia of the water upstream and/or downstream of the valve, applies large forces to the valve, and may result in damage to the valve. Further, the collision that occurs with a sudden closure causes shock waves and echoes which may be propagated through an associated pipe or water reticulation system. Apart from damage to the valve, these shock waves may cause damage to the pipe or reticulation system far from the valve.

Fluid hammer is worst when the valve is fully open and the fluid flowing through the valve reverses direction, which forces the valve to rapidly close. The inertia of the moving valve parts and the upstream and downstream fluid can exert great stresses on the valve, conduit and other structures.

SUMMARY

Applicant recognizes it would be beneficial if a damping valve could be devised that reduced fluid hammer when a valve is closed and to reduce the damage and other inconvenience caused by such fluid hammer.

Disclosed herein is a fluid-damped valve. The fluid-damped valve comprises a valve body defining an internal cavity having an inlet for ingress of a fluid and an outlet for egress of the fluid. The fluid-damped valve comprises a closure member having a narrowed end portion. The closure member is movably disposed within the internal cavity intermediate the fluid inlet and the fluid outlet. The valve body comprises a seat configured to sealingly receive the closure member thereon when the closure member is moved into contact with the seat to form a barrier against flow of the fluid. The seat defines a constricted portion of the internal cavity configured to non-sealingly receive the narrowed end portion of the closure member, whereby the interaction between the end portion and the constricted portion damps the flow of the fluid through the fluid-damped valve.

The valve body forms a damping-fluid cavity when the narrowed end portion is received in the constricted portion of the cavity.

In an embodiment, the seat may comprise an annular seat defining an aperture, e.g., circumferentially surrounding the aperture leading or opening into the constricted portion.

In an embodiment, the narrowed end portion is associated with the inlet.

In an embodiment, the closure member comprises a head portion (which is the main body of the closure member) for sealingly contacting, e.g., bearing against the seat, and the narrowed end portion may extend from the head portion.

The closure member may comprise a piston which can move reciprocally within the internal cavity of the valve body.

In one example embodiment, the fluid-damped valve may be a sliding piston valve.

The narrowed end portion may comprise a plug, e.g., a cylindrical plug.

The narrowed end portion of the closure member may have a variable cross-sectional area along its length. In particular, the narrowed end portion may have a cross-sectional area that decreases along its length in a direction away from the head portion.

Thus, the narrowed end portion has a head end and a free end remote from the head end, and the cross-sectional area of the end portion which may reduce or deplete in a direction from the head end to the free end.

In one form, the end portion may taper inwardly from the head end to the free end in a linear fashion. In another embodiment, the end portion may taper inwardly from the head end to the free end in a curved fashion, e.g., with a configuration that is parabolic. For example, the narrowed end portion may have a parabolic configuration or a frusto-conical configuration.

Further, the valve may include an adjusting arrangement for adjusting the level of damping of the fluid damped valve. The adjusting arrangement may include providing a branch line in parallel with the constricted portion of the internal cavity that enables fluid to bypass the constricted portion. The adjusting arrangement may further include a control valve for selectively opening or closing the branch line. The adjusting arrangement may also include a one-way valve for permitting fluid flow through the branch line in one direction only.

The fluid-damped valve may be one of a check-valve, a non-return valve, a foot-valve, and a poppet valve.

Alternatively, the closure member may comprise a flap or generally any suitable type of closure.

The fluid may be a liquid. In one example form, the liquid may be water. The liquid may be in the form of a slurry containing particles distributed throughout the liquid.

Alternatively, the fluid may be a gas.

The fluid-damped valve may include a fluid conduit in fluid communication with the fluid inlet and the internal cavity.

The disclosure also extends to a fluid flow system comprising a fluid-damped valve in accordance with any of the other aspects of the disclosure.

The fluid flow system may include an upstream conduit operatively connected to the inlet of the valve body.

Further, the fluid flow system may also include a downstream conduit operatively connected to the outlet of the valve body.

BRIEF DESCRIPTION OF THE DRAWINGS

A fluid damped valve in accordance with this disclosure may manifest itself in a variety of forms. It will be convenient to hereinafter describe several embodiments of the disclosure in detail with reference to the accompanying drawings. The purpose of providing this detailed description is to instruct persons having an interest in the subject matter of the invention how to carry the disclosure into practical effect. However, it is to be clearly understood that the specific nature of this detailed description does not supersede the generality of the preceding broad description. In the drawings:

FIG. 10 shows a longitudinal section view of yet another embodiment of a fluid-damped valve, that is a flap valve in a closed state;

FIG. 11 shows a longitudinal section view of the fluid-damped valve of FIG. 10 in a near-open state;

DETAILED DESCRIPTION

Figure 3:
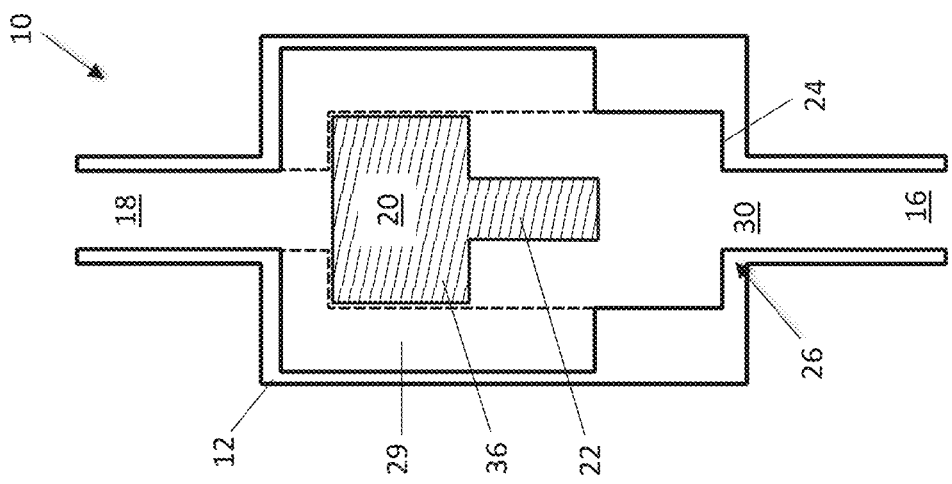
FIG. 3 shows a longitudinal section view of the fluid-damped valve of FIG. 1 in a fully open position.

FIGS. 1 to 4 illustrate a longitudinal section view of an embodiment of a fluid-damped valve in the form of a check valve and generally indicated by the numeral 10.

The fluid-damped valve comprises a valve body or valve housing 12. The body 12 defines an internal cavity 14 having a fluid inlet 16 for ingress of a working fluid which in this example application of valve 10 is a liquid such as water. The internal cavity 14 has a fluid outlet 18 for egress of the fluid. The fluid-damped valve 10 comprises a closure member 20 in the form of a slidably mounted piston having a narrowed end portion 22 in the form of a plug. In this embodiment but not necessarily all embodiments, the narrowed end portion 22 depends from a head portion 36 of the closure member 20. The closure member 20 is positioned intermediate the fluid inlet 16 and the fluid outlet 18 and is movably disposed within the internal cavity 14 between the fluid inlet 16 and the fluid outlet 18. The closure member 20 is movable by a flow of the fluid, or equivalently fluid pressure through the valve 10.

The fluid-damped valve body 12 comprises a seat 24 configured to sealingly receive the closure member 20, specifically a surface 38 of the head portion 36 adjacent the narrowed end portion 22. The closure member 20 can consequently be moved by the fluid into contact with the seat 24 to form a barrier against flow of the fluid and close the valve 10. When the closure member 20 is held to or up against the seat 24 by fluid pressure, there is no flow in a reverse direction through the valve. The seat 24 circumferentially surrounds and defines a constricted portion 26 of the internal cavity 14 configured to non-sealingly receive the narrowed end portion 22. This way when the narrowed end portion 22 is progressively displaced into the constricted portion 26 of the internal cavity 14 from an open position, the flow of the fluid through the constricted portion 26 is retarded or damped.

The valve 10 comprises a closure member guide 21 to guide the movement of the closure member 20 within the valve body 12. The fit between the head portion 36 and the walls of the internal cavity 14 is a close fitting clearance fit. The valve 10 is fully open when the head portion 36 is at the fluid outlet 18 of the internal cavity 14 and at the limit of its travel in the open direction. The flow of the fluid in a forward direction through the valve 10 when the head portion 36 is at its maximum when the valve 10 is in a fully open position.

The various parts of the valve 10 may be formed from a polymer, or a metal, e.g., in the form of aluminium, or generally any other suitable material. The parts may be fabricated by casting, molding including injection molding, machining, or additive manufacturing. Generally, any suitable fabrication method may be used.

Figure 2:
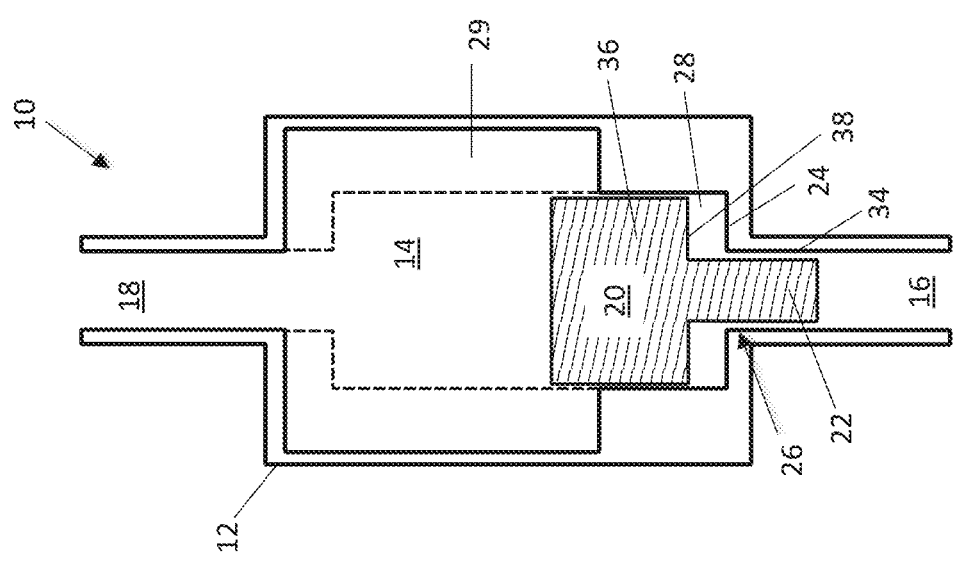
FIG. 2 shows is a longitudinal section view of the fluid-damped valve of FIG. 1 partially closed.
Figure 1:
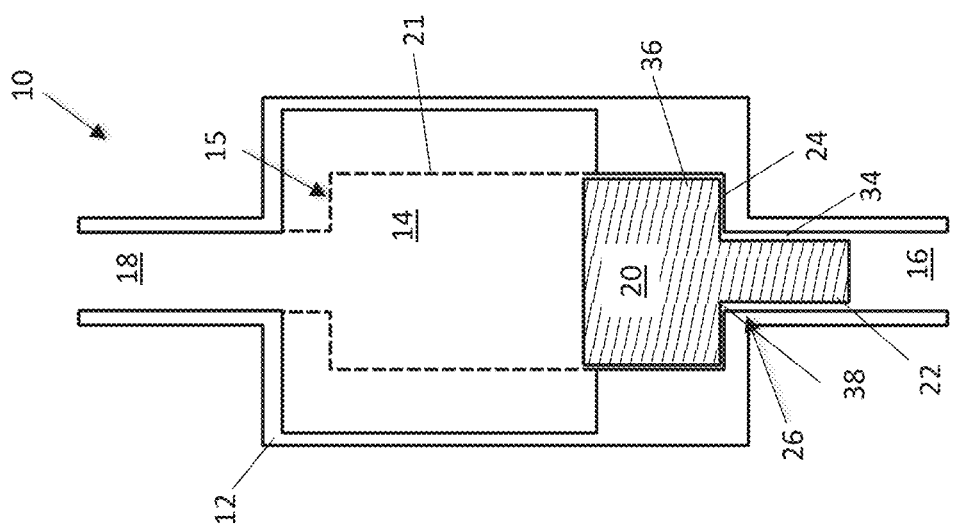
FIG. 1 shows a longitudinal section view of one embodiment of a closed fluid-damped valve.

FIG. 2 shows a longitudinal section view of the fluid-damped valve 10 with the narrowed end portion 22 having entered the constricted portion 26 during closing of the valve 10, but without a seal being yet formed to shut off fluid flow through the inlet 16. FIG. 3 shows a longitudinal section view of the fluid-damped valve 10 with the closure member 20 positioned in a valve open cavity part 29 of the internal cavity 14 in the fully open position. When the closure member 20 is forced towards the inlet 16 by a fluid pressure directed from the outlet 18 to the inlet 16, entry of the narrowed end portion 22 into the constricted portion 26 results in damping of the displacement of the closure member 20, which may be rapid. This attenuates the forces applied to the valve and may reduce fluid hammer (which in this example application of valve 10, is water hammer).

The seat 24 circumferentially surrounds and defines an aperture 30 at the constricted portion 26, adjacent to the inlet 16, for passage of the fluid towards the inlet 16. The seat 24 is in the form of an annular seat and the aperture 30 is at the centre of the seat 24. As shown in FIG. 2, the narrowed end portion 22 can be disposed in the aperture 30 and is associated with the inlet 16. A fluid passageway 34 is formed between the end portion 22 and the constricted portion 26 when the narrowed end 22 is disposed in the aperture. That is, a complete seal is not formed between the narrowed end 22 and the constricted portion 26, allowing fluid to travel along the fluid passageway 34 to or from the inlet 16.

As shown in FIG. 2, the body 12, the closure member 20 and the seat 24 define a damping-fluid cavity 28 when the narrowed end portion 22 is received by the constricted portion 26 of the interior cavity 14.

In use, working fluid is disposed in the damping-fluid cavity 28, which functions as a damping fluid. The damping-fluid cavity 28 is in fluid communication with the inlet 16, however, reverse fluid pressure causes the fluid in the damping-fluid cavity 28 to only move relatively slowly to the inlet 16. The rate of fluid flow into the damping-fluid cavity 28 may be greater when the narrowed-end portion 22 is nearly withdrawn from the constriction portion 26.

The length of the damping time of the fluid moving into and out of the damping-fluid cavity 28 can be selected for any given application by changing the volume of the damping-fluid cavity 28 bearing in mind the rate of flow stays the same. This can be achieved, for example, by changing the size of the closure member 20, tapering the closure member 20, changing the size of the fluid passageway 34, or by adding external piping, with adjustable valves and restrictions.

Figure 4:
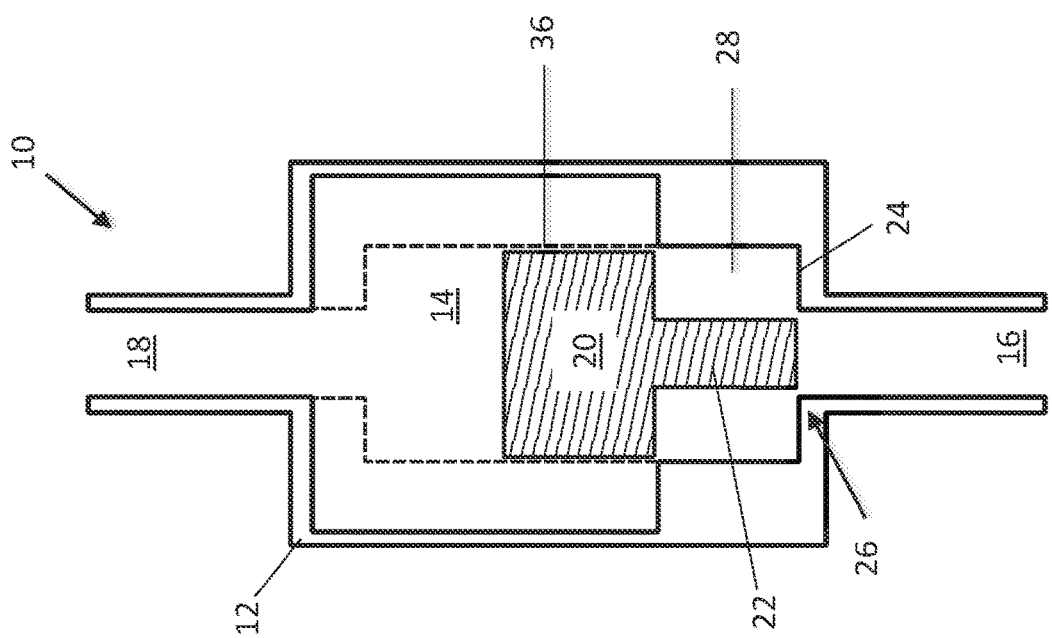
FIG. 4 shows a longitudinal section view of the fluid-damped valve of FIG. 1 with the closure member in a withdrawn position.

FIG. 4 shows a longitudinal section view of the fluid-damped valve 10 with the closure member 20 withdrawn from the constricted portion 26. Further movement of the closure member 20 towards the outlet 18 and into the cavity 14 by forward fluid flow opens the valve 10 completely.

Figure 5:
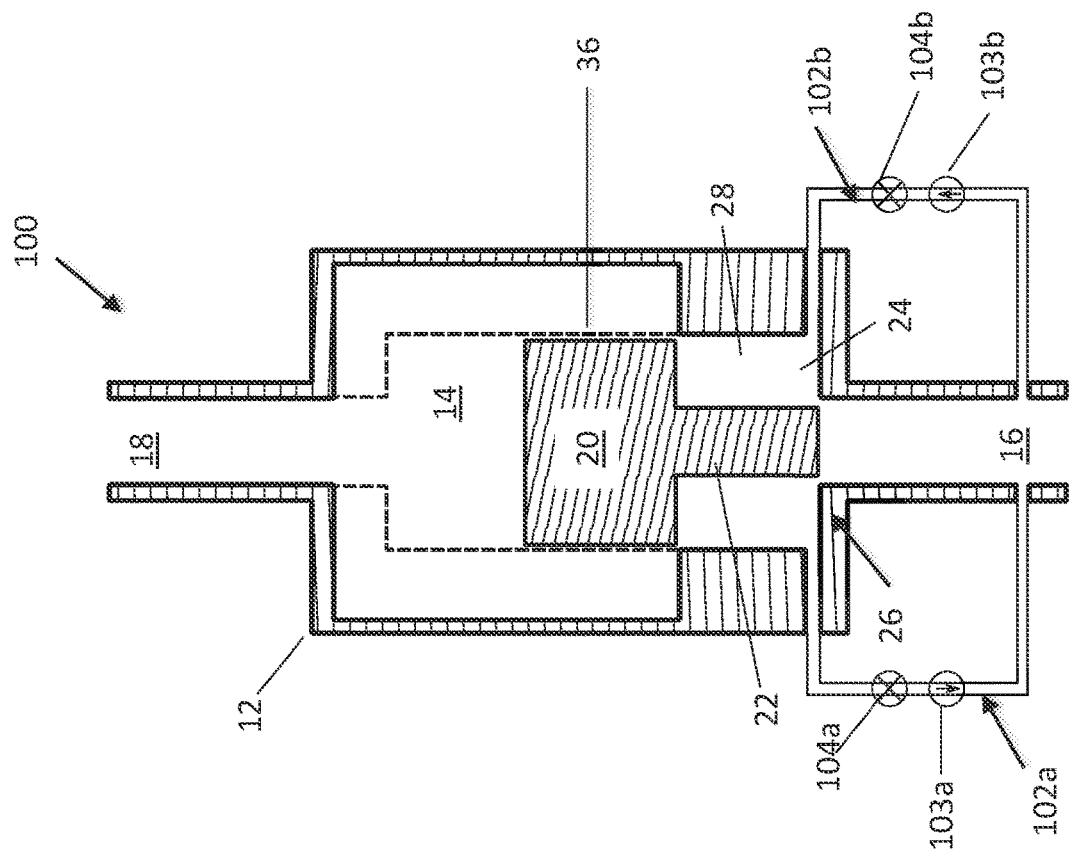
FIG. 5 shows a longitudinal section view of another embodiment of a fluid-damped valve with the closure member in a withdrawn position.

FIG. 5 shows a longitudinal section view of another embodiment of a fluid-damped valve 100, where parts similar or identical in form and/or function to those in FIGS. 1 to 4 have the same reference numerals unless otherwise indicated.

The fluid-damped valve 100 comprises fluid conduits 102a and 102b and control valves 104a and 104b on left and right sides of the body 12. It also includes non-return valves 103a and 103b on the lines 102a and 102b as shown in the drawings. The fluid conduits 102a and 102b are in fluid communication with the fluid inlet 16, the internal cavity 14, and the damping-fluid cavity 28 when formed. These features provide an additional passageway for fluid to enter or leave the fluid cavity 28 and thus confer an ability to adjust or vary the degree of damping that is applied or achieved when the valve 100 is in use.

In particular, the conduit 102a, non-return valve 103a and control valve 104a enable the level of damping to be adjusted when the valve 100 is closing. An operator can control the level of damping applied to the valve by the extent to which control valve 104a is opened. If the control valve 104a is opened fully, the degree of damping during the closure of valve 100 is reduced. By contrast, if the control valve 104a is closed, the level of damping being applied is increased.

By contrast, the conduit 102b, non-return valve 103b and associated control valve 104b enables the level of damping to be adjusted when the valve 100 is opening. This is done by controlling the extent to which the control valve 104b is opened. If the control valve 104b is fully opened, then fluid can flow from fluid inlet 16 through the conduit 102b to the chamber 28, reducing the damping as valve 100 opens. By contrast, if the control valve 102b is closed the level of damping when the valve 100 is opening is increased.

This feature of the conduit and control valve described above therefore provides a user with an ability to independently control the level of damping that is applied during the opening and closing phases of valve 100. The level of damping can be adjusted to suit a particular situation and, for example, if a high level of damping is not required then the valves 102a and 102b can be opened.

In addition to the arrangement described above with reference to FIG. 5, a spring could also be used to modify the damping of the valve. For example, a spring loaded under compression between the valve body and the closure member may assist in displacing the closure member into the damping chamber.

Figure 7:
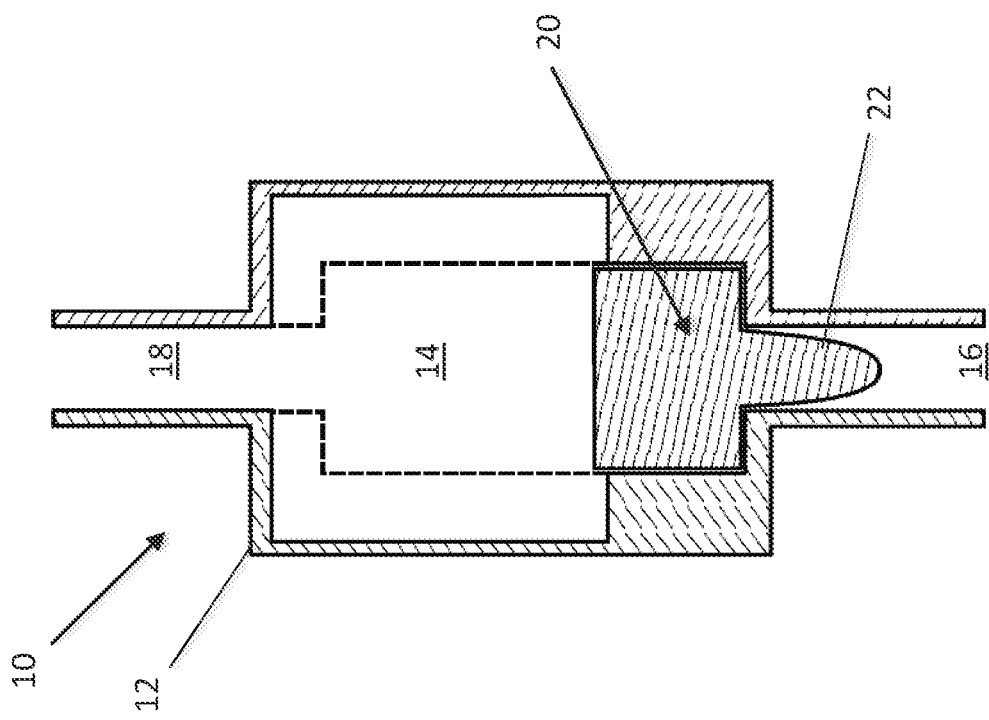
FIG. 7 shows the fluid damped valve of FIG. 6 in a fully closed position.
Figure 6:
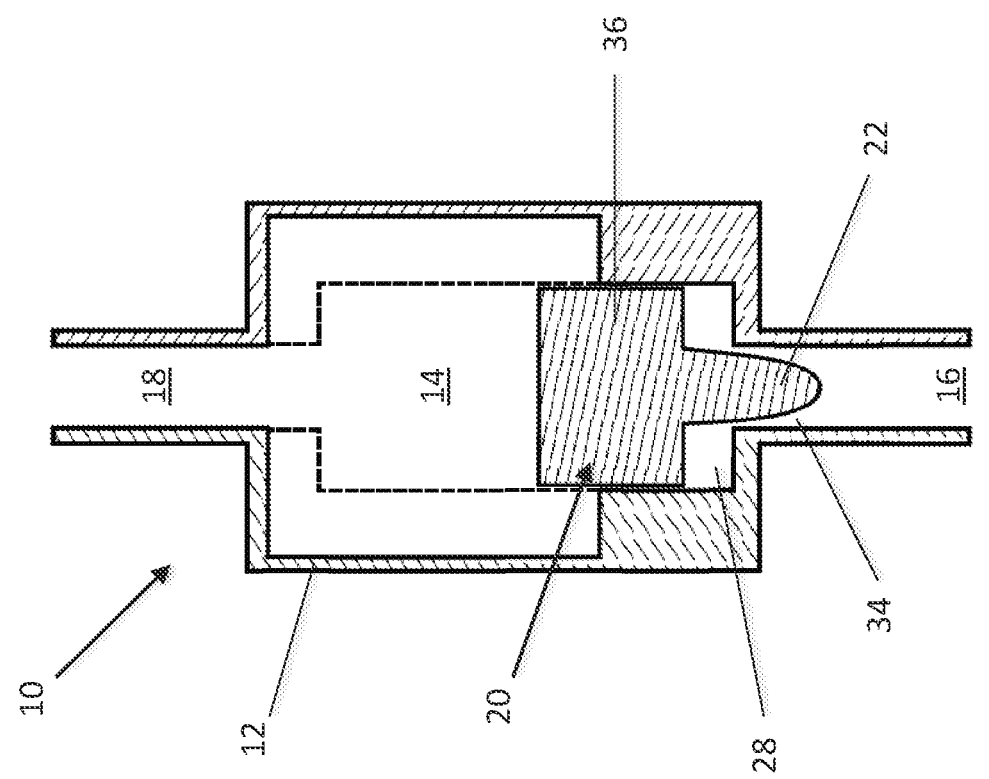
FIG. 6 shows a longitudinal section view of yet another embodiment of a fluid damped valve with its closure member in a partially closed position.

FIGS. 6 and 7 illustrate a fluid damped valve 10 in accordance with another embodiment of the invention. As this embodiment is structurally and functionally similar to the preceding embodiments, the following description will focus on the differences between this embodiment and the preceding embodiment. Further, unless otherwise indicated, the same reference numerals will be used to refer to the same components.

In FIGS. 6 and 7, the narrowed end portion 22 of the closure member 20 has a cross-sectional area that is progressively reduced in a direction towards its terminal or free end. In fact, the cross-sectional configuration defines a parabola from its end adjacent to the head portion 36 in a direction towards its free end.

The effect of this structural feature is that the cross-sectional area at an entrance to the constricted portion 26 reduces as the narrowed end 22 of the closure member 20 is progressively displaced into the constrained portion 26 towards the closed position. Thus, the available cross-sectional area for fluid flow decreases with displacement of the closure member 20 which causes increased damping. The decreased cross-sectional area progressively increases damping of the closure member 20 as it moves towards the fully closed position. Applicant has shown that this parabolic configuration leads to improved damping of the valve particularly when there is severe water hammer.

Figure 8:
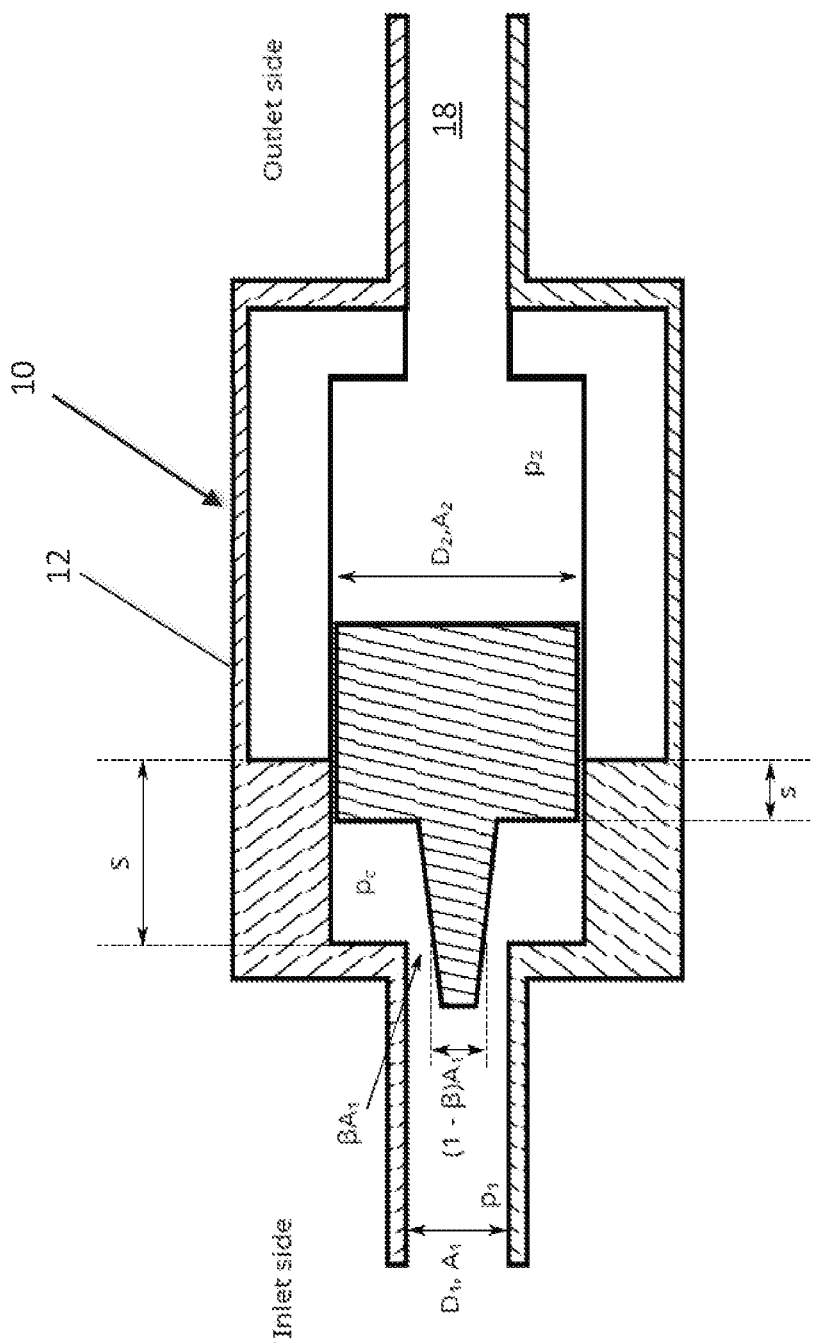
FIG. 8 shows a longitudinal section view of yet another embodiment of a fluid damped valve with its closure member in a partially closed position.
Figure 9:
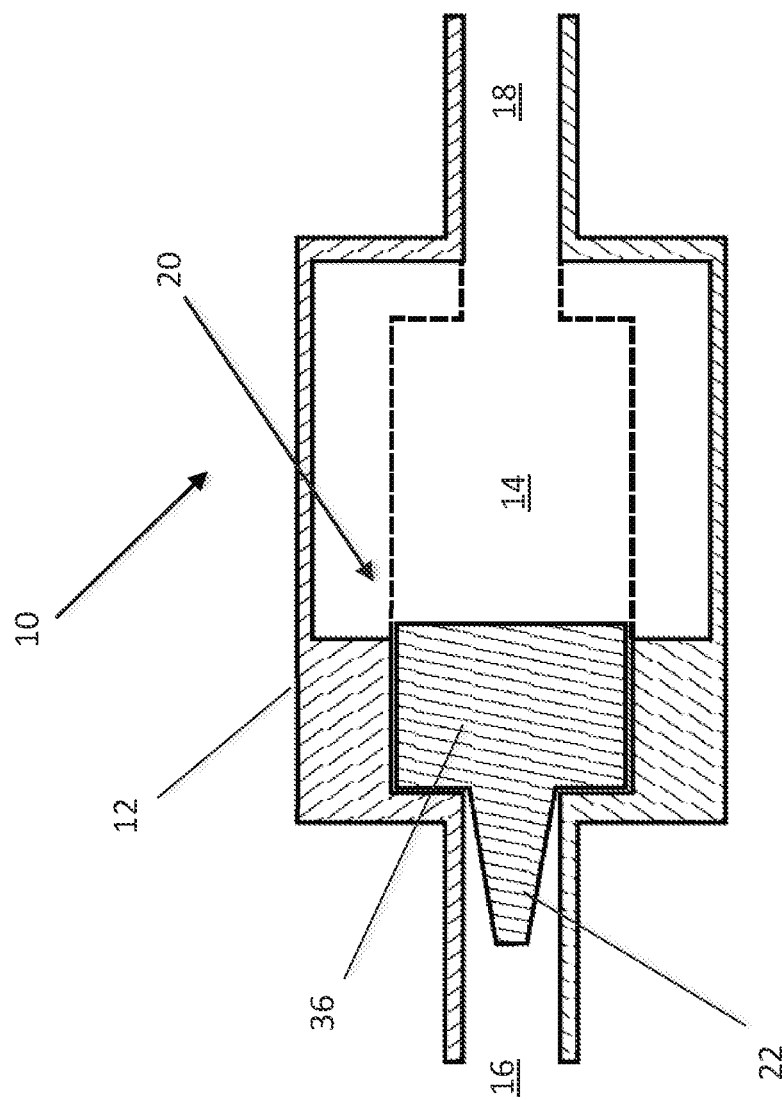
FIG. 9 shows the fluid damped valve of FIG. 8 in a fully closed position.

FIGS. 8 and 9 illustrate a variation on the fluid damped valve in FIGS. 6 and 7. In this variation, the narrowed end portion 22 of the closure member 20 is in the form of a frusto-conical section. It thus has a circular cross-sectional configuration along its length. The conical section tapers inward along its length towards the free end in a linear fashion. This is different to the preceding embodiment where the cross-sectional configuration curved inward along its length towards its free end.

The technical effect of this structural feature is the same as in the preceding embodiment, namely that the cross-sectional area between the constricted section 26 and the narrowed end portion 22 available for fluid flow decreases the further that the closure member 20 is displaced into the constricted portion 26.

Figure 12:
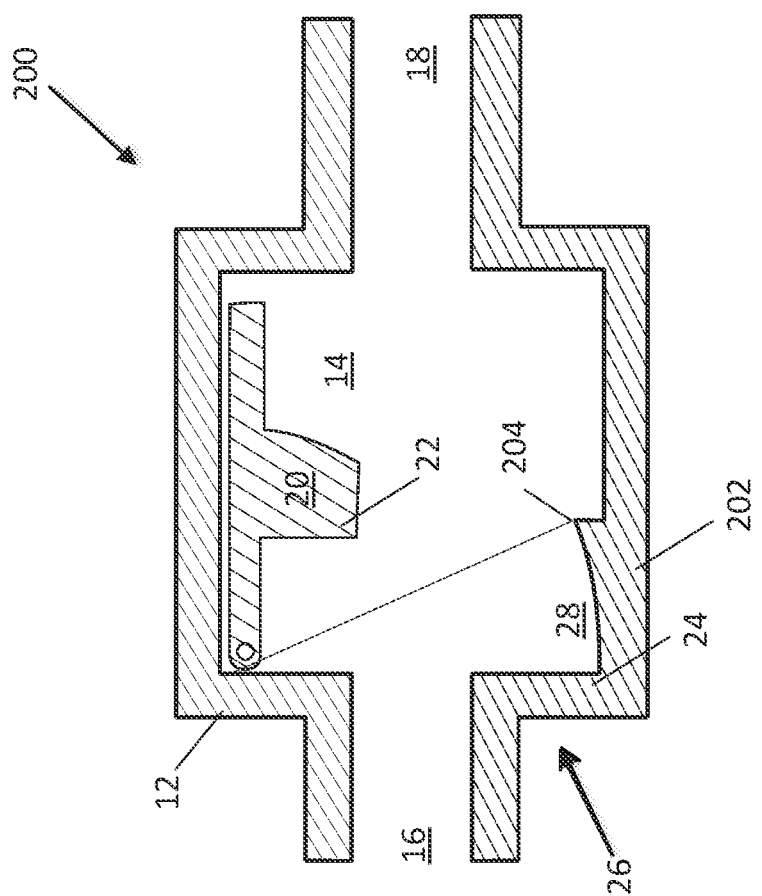
FIG. 12 shows a longitudinal section view of the fluid-damped valve of FIG. 10 in a fully open state.

FIGS. 10 to 12 show longitudinal section views of yet another embodiment of a fluid-damped valve 200. In FIGS. 10 to 12, where parts that are similar in form and/or function to those in FIGS. 1 to 9, are given the same reference numerals unless otherwise indicated.

FIGS. 10 and 11 show longitudinal section views of the fluid-damped valve 200 in respectively a closed state and a closing state. The closure member 20 is in the form of a flap pivotably mounted within the cavity 14. A fluid passageway is formed in the constricted portion 26 and the narrowed end 20 when received therein, allows damped release of fluid from damping-fluid cavity 28. A cavity wall 202 is curvilinear and has a shape traced out by the distal end 204 of the moving flap 20. FIG. 12 shows the same valve 200 in a fully open position with the moving flap 20 pivoted away from the inlet 16.

Example Applications in Fluid Systems

In a first example, the fluid-damped valve 10 is inserted within a plumbing system for reticulation of town water within a building.

In a second example, a fluid-damped valve 10 is installed at an inlet of a liquid pump in the form of a water pump, and another fluid-damped valve 10 is installed at the outlet of the water pump.

In a third example, a fluid-damped valve is attached to the outlet of a water tank upstream of a water pump, in which case, the fluid-damped valve is a foot valve for keeping water in the pipes.

In a fourth example, a fluid-damped valve 10 is used in a HVAC system, where coolant is pumped vertically. The fluid-damped valve prevents coolant from flushing back down.

Now that embodiments have been described, it will be appreciated that some embodiments in accordance with the disclosure provide the following working advantages:

Embodiments of the valve may damp closure of the valve, which may allow the moving valve parts (and the fluid upstream and downstream thereof) to deaccelerate or decelerate more evenly during valve closure, at least reducing fluid hammer.

The degree of damping may be tailored for the specific application.

Embodiments may not require additional moving parts, which may improve the reliability of the valve, reduce its cost, reduce corrosion thereof, reduce complexity of the valve, and ease maintenance of the valve.

No damping medium additional to that in the conduit is required.

Opening of the valve may also be damped, so that fluid hammer when the valve is opened may also be reduced.

Further:

While the illustrated embodiments have a cylindrical body, internal cavity, and closure member, generally any suitable geometry may be used, examples of which include but are not limited to oval, square or rectangular geometries.

The fluid may generally be any suitable liquid or gas, examples of which include water, fluid chemicals, suspensions, natural gas, and petroleum products including diesel fuel, petrol, and petroleum gas.

The seat's aperture needs not be central to the seat.

Embodiments include non-return valves, foot-valves and poppet valves.

The closure member may take a form other than a piston.

The narrowed end may be conical, in which case the damping starts off weak but gets stronger as the valve approaches fully closed.

Conduits and/or valves can be used to tune or calibrate the damping rate by adjusting the flow through the connecting pipe.

If damping is required on closing, but not opening, smaller, conventional one-way valves between the upstream pipe and the damping volume will allow the damping volume to fill quickly during operation, speeding valve opening without affecting the damping during valve closure.

The valve may be a flap valve, or generally any type of valve.

Applicant has analyzed the hydrodynamic behaviour of a fluid damped valve as described above in the detailed description. The Applicant has derived equations that govern the movement and closure of the closure member, and from this it has determined some preferred profiles and dimensions for the valves to mitigate fluid-hammer.

As described above, the fluid-damped check valve contains a moving closure member with a profiled narrowed end portion in the form of a plug. When fluid flows through the valve in the normal, desired direction, the closure member moves out of the damping chamber, allowing full fluid flow through the valve from an 'Inlet Side' to an 'Outlet Side'. When fluid tries to move in an opposite direction (i.e., in the direction that is intended to be blocked, from the 'Outlet Side' to the 'Inlet Side'), the valve moves into the damping chamber (possibly assisted by a spring), and then, under the influence of a pressure difference across the valve, the closure member moves further into the damping chamber and the plug interposes in the orifice or constricted portion 26, squeezing the enclosed fluid out of the damping chamber between the plug of the closure member and a wall of the orifice, slowing and damping the valve closure. When the closure member is fully received in the damping chamber, the valve seats and the flow is fully cut off.

The plug of the closure member may be configured with a profile which influences the manner in which the closure member damps the valve closure.

The symbols and units used in this hydrodynamic analysis are set out in FIG. 8. The description of parameters of each of these units and symbols is set out below:

$D_1$ Diameter of the orifice (m)
$A_1$ Area of the orifice (m$^2$)
$D_2$ Diameter of the large end of the closure member (m)
$A_2$ Area of the large end of the closure member (m$^2$)
$p_1$ Instantaneous pressure in the inlet side (Pa)
$p_2$ Instantaneous pressure in the outlet side (Pa)
$p_c$ Instantaneous pressure in the damping chamber (Pa)
S Closure member or piston stroke length from initial engagement with damping chamber to closure (m)
$\rho$ Fluid density (kg/m$^3$)
s The proportion of the full stroke L that the closure member has moved into the damping chamber (dimensionless, values 0.0→1.0)
$\beta$ The relative area of the orifice as a fraction of $A_1$ that is open to flow from the damping chamber. In general, β is a function of s, and changes as the closure member moves into the damping chamber (dimensionless, values 0.0→1.0)

β$A_1$ The cross sectional area of the orifice open to flow from the damping chamber (m²)

(1−β)$A_1$ The cross sectional area of the orifice that is occluded by the plug (m²)

$C_d$ Flow coefficient for simple orifices (assumed 0.7 below)

The Applicant has simplified and idealized the hydrodynamic analysis with the following assumptions and simplifications:

Fluid is incompressible, viscid.
Friction is ignored.
Inertia of the closure member is ignored.
Flow through the orifice is simple per the conventional valve flow equation.
Vena constricta effects are ignored.
Density of the closure member is same as density of the fluid.
Reynolds number is large and all flow is turbulent.
There is no cavitation or breaking of the fluid column.
Leakage past the plug is ignored.

The different stages of operation of the fluid damped valve are considered in turn below.

Valve Fully Open

When the valve is fully open, the closure member is displaced completely out of the damping chamber, and the flow through the valve is described by the conventional valve flow equation below:

$$q = C_d\, A\,\mathrm{sqrt}(2\Delta P/\rho).$$

Valve Starts Closing

When the flow starts to reverse, the closure member is in the fully open position, and starts to move towards the damping chamber. Until the closure member engages with the damping chamber, flow through the valve is described as in the valve fully open condition described above.

Damped Closure

Damped closure occurs when the flow of fluid has reversed its direction and is flowing from right to left in FIG. 8. As damped closure starts occurring under the influence of the flow, the closure member has started to move into the damping chamber as shown in FIG. 8 above.

$A_c$ is the area of the damping chamber on inlet side.
$$A_c = A_2 - A_1 \quad\quad\quad 1$$

The force balance on the closure member when the plug fills the orifice is set out below:

$$p_1 A_1 + p_c A_c = p_2 A_2$$
$$p_c A_c = p_2 A_2 - p_1 A_1$$
$$p_c A_c - p_1 A_c = p_2 A_2 - p_1 A_1 - p_1 A_c$$
$$A_c(p_c - p_1) = p_2 A_2 - p_1(A_1 + A_c)$$
$$= p_2 A_2 - P_1(A_1 + A_2 - A_1) \text{ from equation 1}$$
$$= p_2 A_2 - P_1 A_2$$
$$= (p_2 - p_1) A_2$$
$$p_c - p_1 = (p_2 - p_1) A_2 / (A_2 - A_1) \quad\quad 2$$

The volume flow (m³/s) out of the damping chamber through the orifice as a function of the pressure difference between the damping chamber and the inlet side ($p_c - p_1$), is considered as a simple orifice flow:

$$q_{vol} = C_d \beta A_1 \mathrm{sqrt}(2/\rho)\mathrm{sqrt}(p_c - p_1) \quad\quad 3$$

The volume balance over a time Δt, where the closure member moves Δs further into the damping chamber and the plug protrudes further into the orifice is defined below. Consider the volume of the fluid and closure member and plug bounded by the large end of the closure member, the damping chamber walls and the orifice at the damping chamber:

$$\Delta s\, S\, A_2 = \Delta s\, S(1-\beta) + q_{vol} \Delta t \quad\quad 4$$

$$\Delta s\, S(A_2 - (1-\beta)A_1) = q_{vol} \Delta t$$

substitute from equation 3:

$$\Delta s\, S(A_2 - (1-A_1)) = C_d \beta A_1 \mathrm{sqrt}(2/\rho)\mathrm{sqrt}(p_c - p_1)\Delta t$$

rearrange and as Δt→0, the speed of the closure member movement is:

$$ds/dt\, S(A_2 - (1-A_1)) = C_d \beta A_1 \mathrm{sqrt}(2/\rho)\mathrm{sqrt}(p_c - p_1)$$

substitute from equation 2:

$$ds/dt\, S(A_2-(1-A_1)) = C_d\beta A_1\mathrm{sqrt}(2/\rho)\mathrm{sqrt}((p_2-p_1)A_2/(A_2-A_1))$$

$$ds/dt = (C_d\beta A_1 / S(A_2-(1-A_1)))\mathrm{sqrt}(2A_2/\rho(A_2-(1-A_1))\mathrm{sqrt}(p_2-p_1)$$

$$ds/dt = C_d\beta A_1\mathrm{sqrt}(2A_2/\rho)\mathrm{sqrt}(p_2-p_1)/S(A_2-(1-\beta)A_1)^{1.5} \quad 5$$

For a given closure member position s and its resulting β, the rate of closure member movement ds/dt is proportional to the square root of the pressure difference across the valve.

Since β changes as the closure member closes, some limiting values are examined:

β=1 (no plug protruding into the orifice):

$$ds/dt = C_d A_1\mathrm{sqrt}(2/\rho)\mathrm{sqrt}(p_2-p_1)/A_2 S \quad\quad 6$$

β=0 (plug fills the orifice):

$$ds/dt = 0$$

The damping of the opening of the valve is the reverse of the closing.

Equation 5 has been numerically analysed with Matlab, using different pressures and different plug profiles. The following figures were obtained from representative valve dimensions:

S=0.01 m
$D_1$=0.01 m
$D_2$=0.04 m
ρ=1000 kg/m³
$C_d$=0.7

Figure 13:
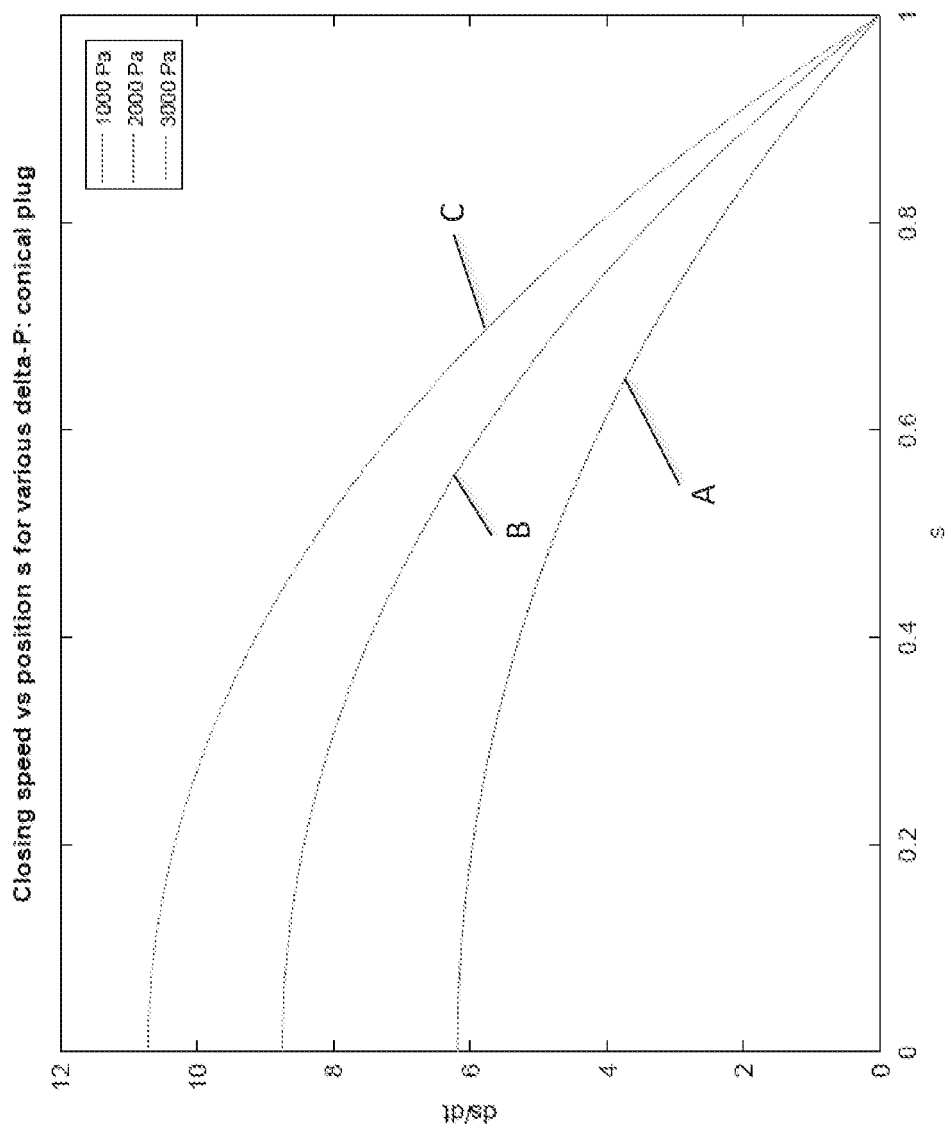
FIG. 13 is a plot of closing speed ds/dt of a conical closure member as a function of the proportion of the full stroke that the closure member has moved into the damping cavity s.

FIG. 13 plots the closing speed ds/dt of a conical closure member against s, the full stroke that the closure member has moved into the damping cavity. The conical closure member is a plain cone with a relative cross section of 0 at its tip and relative cross section 1 at its base. FIG. 13 shows three separate plots A, B and C calculated for different pressure differences across the valve, curves A, B and C being 1000 Pa, 2000 Pa and 3000 Pa respectively. FIG. 13 shows that the flow is decelerated weakly at first and then more strongly as the valve approaches complete closure. That is the valve closure slows down as it approaches the fully closed position.

Figure 14:
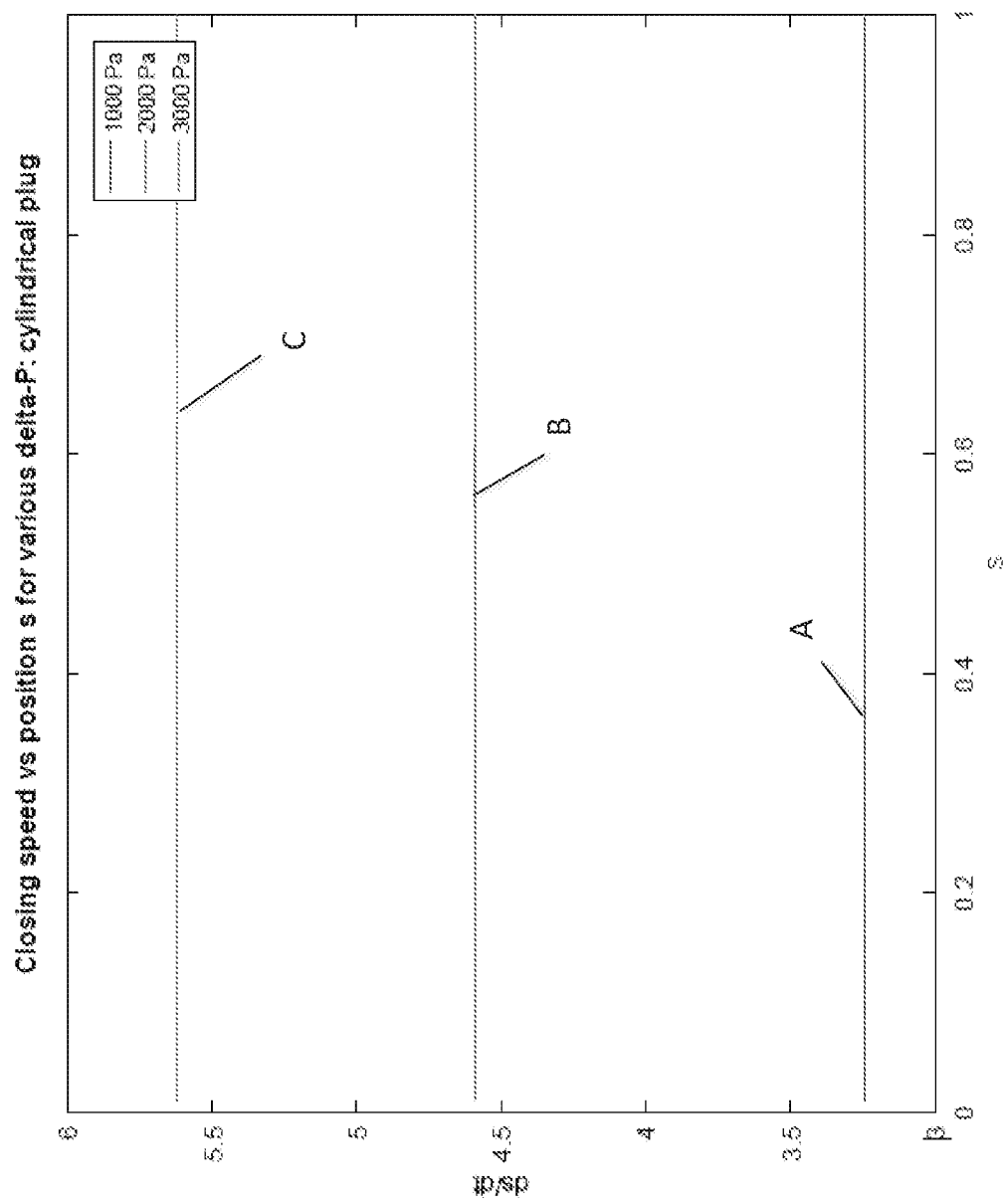
FIG. 14 is a comparative plot of closing speed ds/dt of a cylindrical closure member as a function of the proportion of the full stroke that the closure member has moved into the damping cavity s.

FIG. 14 shows comparative plots for the closing speed ds/dt of a cylindrical plug. Curves A, B, and C represent pressures of 1000 Pa, 2000 Pa and 3000 Pa as for FIG. 13. The cylindrical plug has a cylinder area of 0.5 A1 that gives the same damping speed and closing speed throughout the closure of the valve. The non-zero speed at closure (s=1) can damage the valve and cause water hammer throughout the system.

Figure 15:
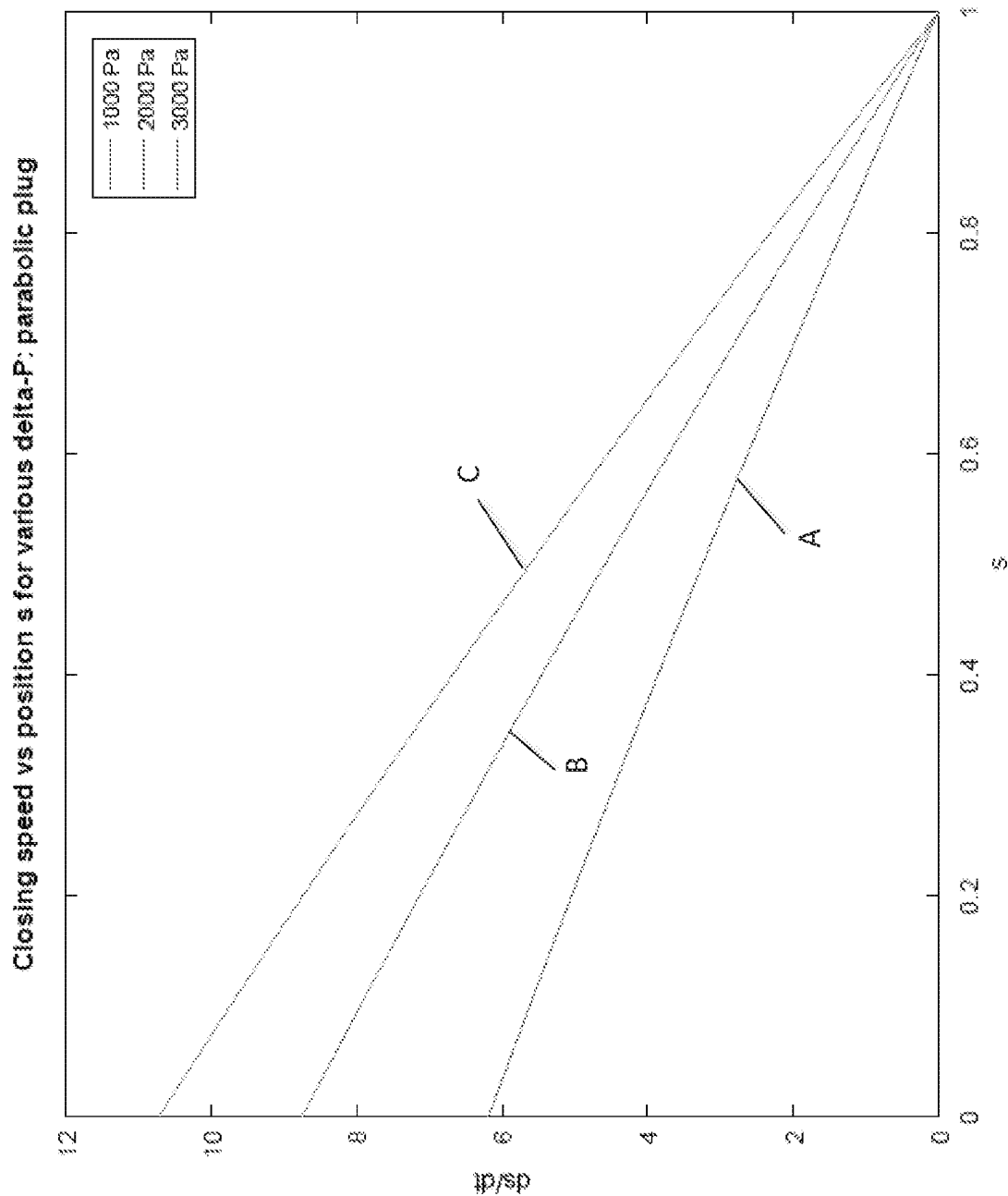
FIG. 15 is a plot of closing speed ds/dt of a parabolic closure member as a function of the proportion of the full stroke that the closure member has moved into the damping cavity s.

FIG. 15 shows further plots for closing speed ds/dt of a parabolic closure member against s, being the full stroke that the closure member has moved into the damping cavity at pressure A, B and as for FIG. 13. The cross-sectional area of the plug increases linearly from the tip to the base such that the profile is parabolic. FIG. 15 shows that for any constant change in pressure the ds/dt is virtually linear, causing almost or substantially constant deceleration of any associated fluid column. This constant deceleration may optimise water hammer reduction. A parabolic closure member profile is a preferred profile for use in the disclosed fluid damping member.

Figure 16:
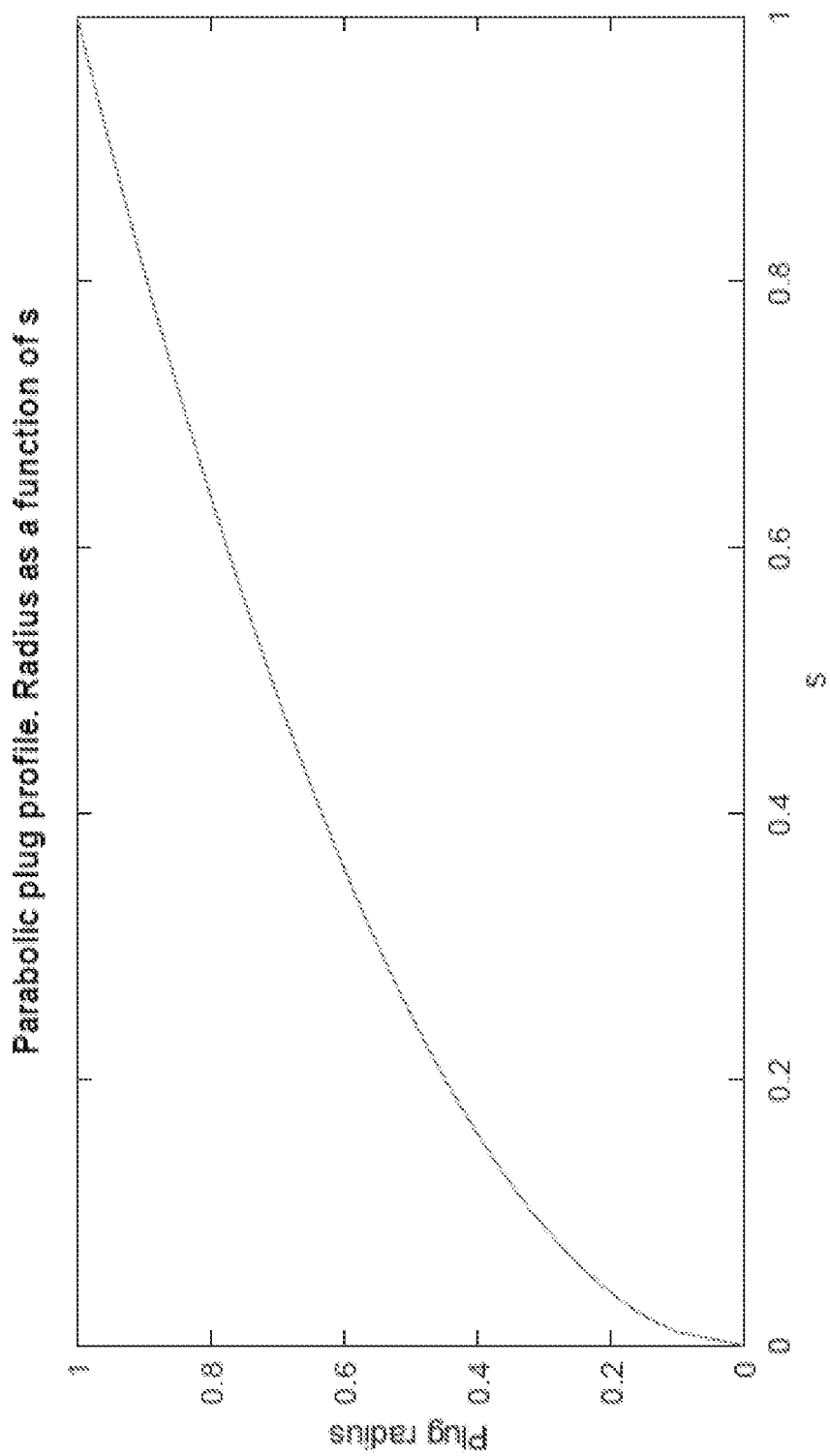
FIG. 16 is a plot of the parabolic profile of the parabolic closure member of FIG. 15 as a function of the proportion of the full stroke that the closure member has moved into the damping cavity s.

FIG. 16 shows the cross-sectional radius profile as a function of s and illustrates the parabolic plug profile.

Such a damped valve is inserted in a fluid filled pipe of length L and cross-sectional area $A_p$. The ambient pressure in the pipe when all fluid is at rest, and the valve is opened is $P_0$. The total mass of fluid in the pipe is $A_p$ L $\rho$ kilograms. The fluid flow has started to reverse (perhaps after a pump has stopped), and at the time the closure member engages with the damping chamber, the reverse fluid velocity in the pipe is $V_0$. It should be borne in mind that $V_0$ is system dependent.

Minimizing water hammer from the valve closure requires us to decelerate this mass or body smoothly from its initial speed of $V_0$ to 0 which requires a constant deceleration with a constant pressure difference across the valve. This condition is obtained when using the parabolic plug.

The maximum deceleration permitted depends on:
the strength of the valves and associated pipes: $p_2$ and $p_c$ must not exceed pressure limits that depend on the design and structure of the valve and pipes, and
the requirement not to break the water column or cause cavitation: $p_1$ must remain positive.

When the fluid is reversing through the valve at velocity $V_o$, just prior to the commencement of the damped closing, the energy in the fluid in the pipe is:

$$E = \tfrac{1}{2} Ap \, L \rho V_o^2.$$

If a parabolic profile plug is chosen and $\Delta P_{max}$ is the maximum permitted pressure across the valve, the energy expended within the valve during the closure of the valve is:

$$E = \Delta p_{max} A_2 S.$$

To provide ideal, critical damping of the flow, the energies must be the same:

$$\Delta p_{max} A_2 S = \tfrac{1}{2} Ap \, L \rho V_o^2.$$

Therefore for ideal damping, $$A_2 S = Ap \, L \rho V_o^2 / 2 \Delta p_{max} \qquad 7$$

This inference of this analysis is that the valve should be sized in an optimum situation when the product $A_2$ S meets the requirement in equation 7. The exact values of $A_2$ and S may be chosen based on convenience of manufacturing. $A_1$ should be chosen to be the same as $A_p$.

One advantage of the embodiments described above with reference to the drawings is that they substantially reduce fluid hammer in a valve when the valve is either closed suddenly or opened suddenly.

It will of course be realized that the above has been given only by way of illustrative example of the invention and that all such modifications and variations thereto, as would be apparent to persons skilled in the art, are deemed to fall within the broad scope and ambit of the invention as is herein set forth.

What is claimed is:

1. A fluid-damped valve comprising: a valve body configured to form an inlet for ingress of a fluid and an outlet for egress of the fluid, and an internal cavity which provides an internal flow path configured to allow fluid to flow through the valve body; a reciprocating closure member which is movably disposed in the internal cavity moveable between a valve-closed position that shuts off fluid flow through the internal flow path, and a valve-open position that permits fluid to flow through the valve body from the inlet to the outlet, the reciprocating closure member having a main closure body portion and a narrowed end portion extending away from the main closure body portion towards the inlet; the valve body comprising a valve seat configured to sealingly contact the reciprocating closure member and form a barrier to fluid flow through the internal flow path from the inlet to the outlet when the reciprocating closure member is in the valve-closed position, the internal cavity comprising; a constricted cavity part adjacent to the inlet and upstream of the valve seat which is configured to have a width that non-sealingly receives the narrowed end portion, a damping fluid cavity part downstream of the valve seat configured to have a width greater than the constricted cavity part and to provide a close fitting clearance fit between the main closure body portion and the valve body, when the main closure body portion is at least partially within the damping fluid cavity part, and a valve open cavity part between the damping fluid cavity part and the outlet configured to have a width greater than the damping fluid cavity part and permit fluid to flow past the main closure body portion, between the main closure body portion and the valve body, in the valve open position, wherein as the reciprocating closure member moves from the valve-open position to the valve-closed position, the main closure body portion moves from the valve open cavity part into the damping fluid cavity part and the narrowed end portion moves into the constricted cavity part, where the narrowed end portion restricts fluid flow and damps the movement of the reciprocating closure member towards the valve seat.

2. A fluid-damped valve defined by claim 1, wherein the valve seat is configured to seal the reciprocating closure member to the valve body in an axial direction and defines an aperture at the constructed portion.

3. A fluid-damped valve defined by claim 1, wherein the narrowed end portion is associated with the inlet.

4. A fluid-damped valve defined by claim 1, wherein the main closure body portion sealingly contacts the seat for sealing against the body in the internal cavity.

5. A fluid-damped valve defined by claim 4, wherein the narrowed end portion extends from the head portion in an axial direction.

6. A fluid-damped valve defined by claim 4, wherein the narrowed end portion comprises a substantially cylindrical plug.

7. A fluid-damped valve defined by claim 4, wherein the narrowed end portion has a cross sectional area that decreases along its length in a direction away from the head portion.

8. A fluid-damped valve defined by claim 7, wherein the narrowed end portion tapers inwardly from the head portion to its free end remote from the head portion.

9. A fluid-damped valve defined by claim 8, wherein the narrowed end portion has a parabolic configuration.

10. A fluid-damped valve defined by claim 8, wherein the narrowed end portion has a frusto-conical configuration.

11. A fluid-damped valve defined by claim 1, that is a one of a check-valve, a non-return valve and a foot-valve.

12. A fluid-damped valve defined by claim 1, that is a sliding piston valve.

13. A fluid-damped valve defined by claim 1, that is a poppet valve.

14. A fluid-damped valve defined by claim 1, including a fluid conduit in fluid communication with the fluid inlet and the internal cavity and wherein the valve is a non-return valve.

15. A fluid-damped valve comprising: a valve body configured to form an inlet for ingress of a fluid and an outlet for egress of the fluid, and an internal cavity which provides an internal flow path configured to allow fluid to flow through the valve body; a reciprocating closure member which is movably disposed in the internal cavity moveable between a valve-closed position that shuts off fluid flow through the internal flow path, and a valve-open position that permits fluid to flow through the valve body from the inlet to the outlet, the reciprocating closure member having a main closure body portion and a narrowed end portion extending away from the main closure body portion towards the inlet; the valve body comprising a valve seat configured to sealingly contact the reciprocating closure member and form a barrier to fluid flow through the internal flow path from the inlet to the outlet when the reciprocating closure member is in the valve-closed position, the internal cavity comprising: a constricted cavity part adjacent to the inlet and upstream of the valve seat which is configured to have a width that non-sealingly receives the narrowed end portion, a damping fluid cavity part downstream of the valve seat configured to have a width greater than the constricted cavity part and to provide a close fitting clearance fit between the main closure body portion and the valve body, when the main closure body portion is at least partially within the damping fluid cavity part, and a valve open cavity part between the damping fluid cavity part and the outlet configured to provide a greater clearance between the main closure body portion and the valve body than that provided by the damping fluid cavity part to thereby permit fluid to flow past the main closure body portion, between the main closure body portion and the valve body, when the valve member is in the valve open position, wherein as the reciprocating closure member moves from the valve-open position to the valve-closed position, the main closure body portion moves from the valve open cavity part into the damping fluid cavity part and the narrowed end portion moves into the constricted cavity part, where the narrowed end portion restricts fluid flow and damps the movement of the reciprocating closure member towards the valve seat.

16. A method of preventing liquid hammer in a pipeline installation for conveying a liquid, the method comprising: a pipeline having an inlet end and an outlet end; a fluid damped valve as defined in claim 1 operatively connected in series with the pipeline between the inlet end and the outlet end, wherein when the reciprocating closure member moves towards the valve closed position in response to changes in flow or pressure within the internal cavity, the narrowed end portion is forced into the constricted cavity part of the internal cavity and restricts fluid flow from the damping fluid cavity part past the narrowed end portion towards the inlet, and damps movement of the reciprocating closure member towards the valve seat to reduce the velocity at which the reciprocating closure member impacts the valve seat.

17. A method of preventing liquid hammer in a pipeline installation according to claim 16, wherein the reciprocating closure member moves towards the valve closed position because the liquid pressure in the pipeline is higher downstream of the outlet of the fluid damped valve, than upstream of the inlet thereof.

18. A method of preventing liquid hammer in a pipeline installation according to claim 16, wherein the closure member moves towards the valve closed position because the flow of liquid through the pipeline is interrupted.

19. A method of preventing liquid hammer in a pipeline installation according to claim 16, wherein the liquid is water or coolant in an HVAC system.

* * * * *